Feb. 3, 1953 — K. J. VAN SICKLE — 2,627,158
CROP PICKUP REEL
Filed Feb. 23, 1951 — 2 SHEETS—SHEET 1
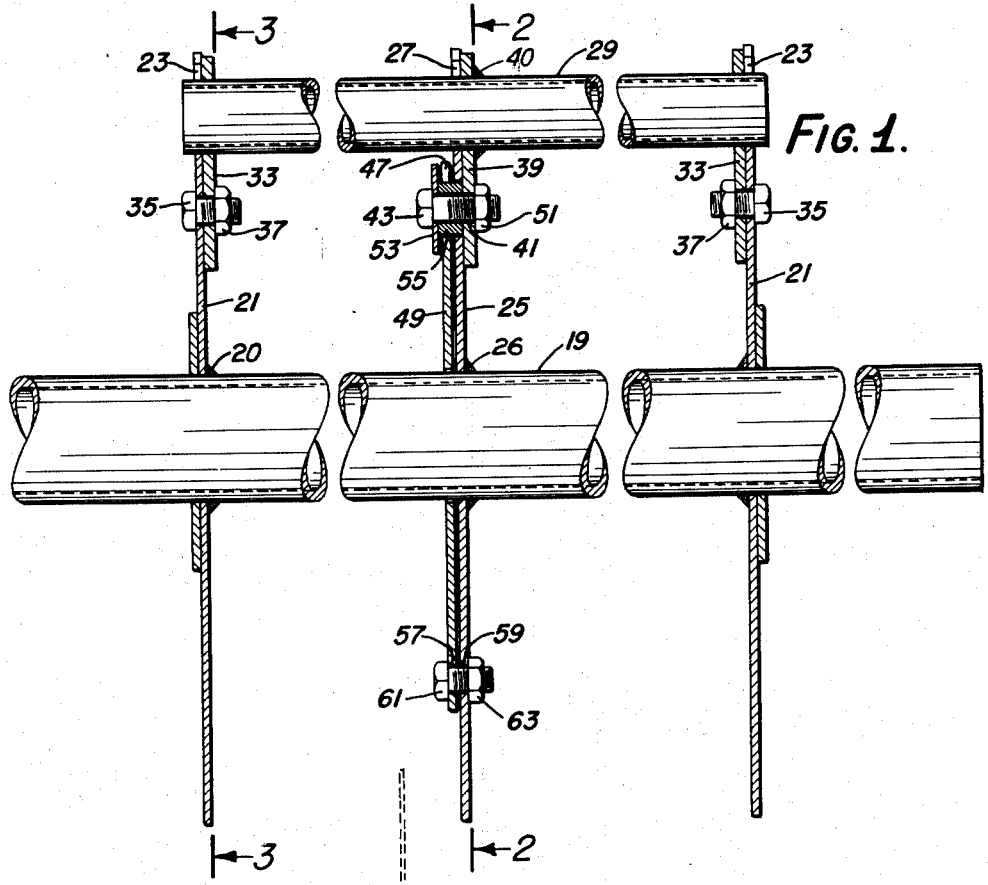
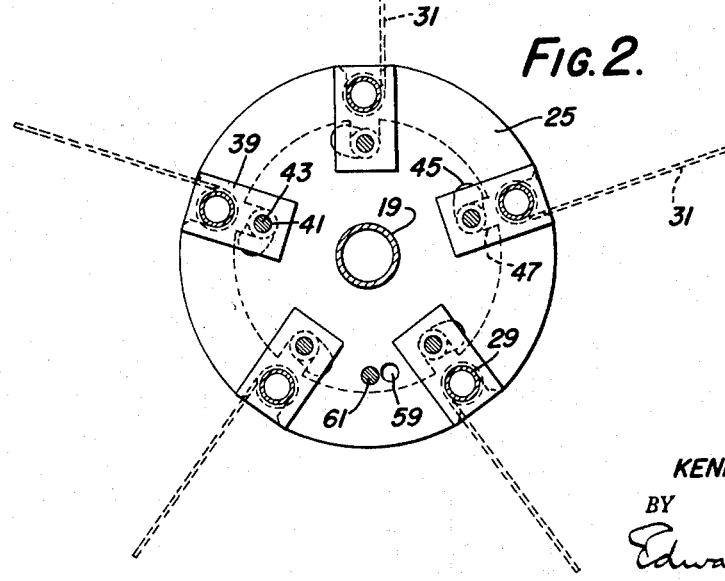
INVENTOR.
KENNETH J. VAN SICKLE
BY
HIS ATTORNEY

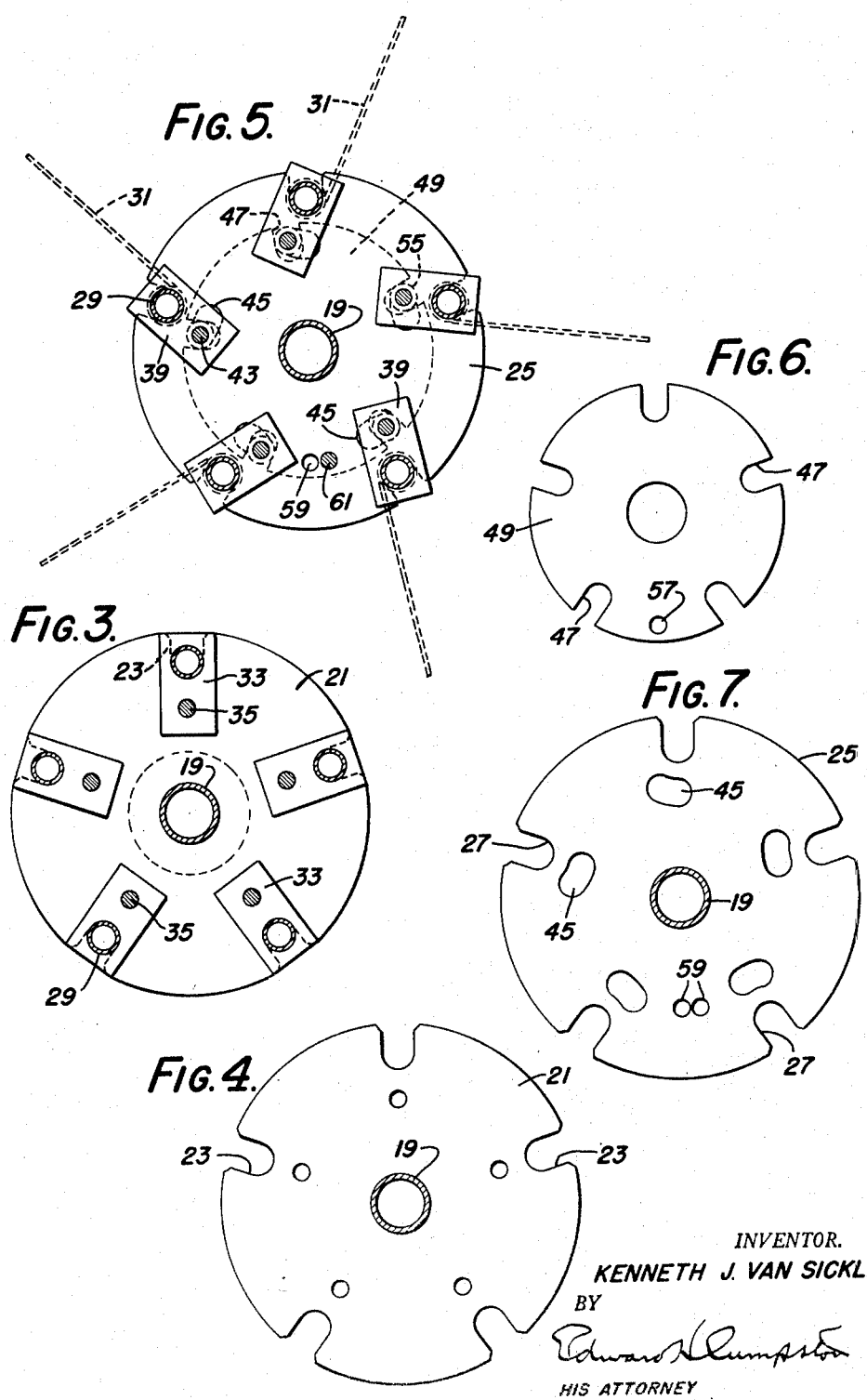

Patented Feb. 3, 1953

2,627,158

UNITED STATES PATENT OFFICE 2,627,158

CROP PICKUP REEL

Kenneth J. Van Sickle, Shortsville, N. Y., assignor to Papec Machine Company, Shortsville, N. Y., a corporation of New York Application February 23, 1951, Serial No. 212,255

5 Claims. (Cl. 56—364)

This invention relates to pick-up reels for picking up crops from the ground and feeding them to a harvesting machine, and more particularly to pick-up reels having a plurality of pick-up fingers which are capable of simultaneous angular adjustment to suit varying operating conditions, one object of the invention being to provide an improved pick-up reel of the above nature having a more simple, practical and efficient type of construction.

Another object is to provide a reel having the above advantages in which the pick-up finger parts are so constructed and arranged so as to be readily detachable for repair or replacement.

To these and other ends the invention resides in certain improvements and combinations of parts, all as will be hereinafter more fully described, the novel features being pointed out in the claims at the end of the specification.

In the drawings:

Fig. 1 is an enlarged fragmentary, front sectional elevation, showing the connections between the drive shaft and an arbor of a pick-up reel embodying the present invention;

Fig. 2 is a sectional elevation on the line 2—2 in Fig. 1;

Fig. 3 is a sectional elevation on the line 3—3 in Fig. 1;

Fig. 4 shows one of the disk parts of the reel detached for better illustration;

Fig. 5 is a view similar to Fig. 2, but shows the arbors and pick-up fingers in a different position of adjustment;

Fig. 6 shows a disk for adjusting the pick-up fingers, detached for better illustration, and Fig. 7 shows another one of the disk parts of the reel, detached for better illustration.

This invention is an improvement in pick-up reels of the type employed for harvesting hay and the like, such as the pick-up reel disclosed in my copending application, Pick-Up Reel for Harvesters, Serial No. 639,178, filed January 5, 1946, now Patent No. 2,548,329, to which reference may be had for a more complete disclosure of the constructional features of the reel not shown herein.

The pick-up reel preferably comprises a longitudinally extending rotary drive shaft which is mounted at the ends thereof in suitable bearings secured to the frame of a harvester or other machine. The reel is rotated by connection with ground engaging wheels or by a tractor power take-off, or by a motor mounted on the harvester frame as disclosed in said application and as well understood in the art. As shown in the above copending application, the drive shaft preferably has a plurality of arbors connected thereto, said arbors being provided with a series of pick-up fingers for removing the crops from the ground. The arbors are capable of limited rotary adjustment so as to change the angle of contact of the pick-up fingers to suit varying ground and crop conditions. The present invention relates more particularly to an improved and more efficient means for simultaneously adjusting said arbors and pick-up fingers.

The present embodiment of the invention, herein disclosed by way of illustration, comprises a longitudinally extending drive shaft 19 (Fig. 1) which has fixed thereon adjacent each end thereof, by welding 20 or other suitable means, a member 21 (Fig. 1), preferably in the form of a circular plate or disk (Figs. 3 and 4), each having its periphery formed with a plurality of circumferentially spaced seats, preferably, in the form of radially extending outwardly opening slots 23 (Fig. 4) the inner ends of which are of semi-circular shape to seat the arbors hereafter described. A similar member or disk 25 is fixed, by welding 26 or other suitable and known means, on shaft 19, intermediate the disks 21 and preferably adjacent the center of the shaft, as shown in Fig. 1, this disk being formed peripherally with similar seats or slots 27. A plurality of arbors, conveniently made in lengths of piping 29, are supported in aligned slots 23 and 27 of the reel disks 21 and 25, respectively, in an adjustable and releasable manner as hereafter described.

Arbors 29 are provided with a series of pick-up fingers 31 (shown by broken lines in Figs. 2 and 5) of any known or suitable construction, being preferably of the known resilient wire type, such as that disclosed in my above copending application. Arbors 29 are adapted to be releasably held in place in aligned slots 23 in disks 21 by a pair of elements or arms 33 which are loosely mounted on said arbors adjacent the ends thereof, as shown in Fig. 1. Arms 33, preferably of metal plate, are adapted to lie against the corresponding disk 21 and are releasably secured thereto by a bolt 35 which passes through closely fitting openings in arm 33 and disk 21. Bolt 35 is fitted with a nut 37 by means of which said arms and disk may be clamped together. It will be understood that although arbors 29 are prevented from moving out of aligned slots 23, said arbors are free to rotate in said slots because of the loose fit between arbors 29 and arms 33. This construction permits convenient angular adjustment of arbors 29 and pick-up fingers 31, by means to be presently described. It is also evident from the above construction that arbors 29 may be readily removed in a radial direction from the open slots of disks 21 by merely removing bolts 35.

A different means is provided for connecting each arbor with the intermediate disk 25 of the drive shaft, comprising an element or arm 39 (Figs. 1 and 2) in the form of metal plate fixed on the arbor by welding 40 (Fig. 1), or other suitable and known means, and provided with an opening 41 (Fig. 1) for closely receiving a bolt 43. Each bolt 43 has a sliding fit in an arcuate slot 45 (Fig. 7) located in disk 25 inwardly of each arbor receiving seat or slot 27, as shown in Fig. 7. With arbor 29 seated in slot 27, sliding bolt 43 laterally in slot 45 rotates or rocks arbor 29 thereby changing the angle of pick-up fingers 31 relative to the ground.

For adjusting the position of bolts 43 in slots 45, the bolts are also passed through outwardly or radially extending slots 47 (Fig. 6) in an annular ring or disk 49. Disk 49, preferably of metal plate, is located adjacent center disk 25, but on the opposite side thereof from arms 39, as shown in Fig. 1, and as slots 47 intersect or cross arcuate slots 45, a rotary adjusting movement of disk 49 relative to disk 25 serves to slide the bolts 43 in slots 45 and rotate or rock arbors 29 in their seats 27 in disk 25, so as to adjust the angularity of the pick-up fingers attached thereto. Bolts 43 are provided with nuts 51 (Fig. 1) for holding arms 39 and disk 49 in position on opposite sides of disk 25. However, in order to prevent binding between disks 25 and 49 and allow relative movement therebetween, bolts 43 are also preferably provided with washers 53 and spacer sleeves 55, which as shown in Fig. 1, allow said bolts to be securely tightened without, however, clamping said disks together.

In order to secure disk 49 to disk 25 for holding the arbors and pick-up fingers in the desired position of angular adjustment, disk 49 is preferably provided with an opening 57 which is adapted to coincide with any one of a series of similar openings 59 in disk 25 through a selected one of which a bolt 61 may be passed, as shown in Fig. 1. Bolt 61 is provided with a nut 63 for holding said bolt in position.

In operation, therefore, when it is desired to change the angular position of arbors 29 and pick-up fingers 31 from their radially extending positions, as shown in Fig. 2, to their advanced positions, as shown in Fig. 5, it is only necessary to remove bolt 61 from the left hand one of holes 59 in disk 25, and rotate disk 49 in a counter-clockwise direction relative to disk 25 until the single hole 57 in disk 49 is brought into alignment with the right hand one of holes 59 in disk 25, after which bolt 61 is reinserted, as shown in Fig. 5.

It is evident from the above description that the invention provides a harvester pick-up reel of a simple, rugged and practical nature, having a construction and arrangement of parts by means of which any one or more of the finger arbors may be readily released and removed from its seats in the reel disks, for removal of one or more of the finger asemblies or the arbor as a whole, thus, facilitating field maintenance and continuous and effective operation of the machine. In addition, the above invention provides an improved means whereby the arbors may all be simultaneously adjusted for changing the angle of the pick-up fingers relative to the ground, by removing but a single bolt and without the necessity of special tools or equipment.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A pick-up reel for harvesters or the like comprising a driving shaft, a plurality of spaced members mounted concentrically on said shaft for rotation thereby, said members being formed peripherally with a plurality of outwardly opening, spaced seats, arbors detachably mounted for rotary adjustment in said seats, pick-up fingers on said arbors, an element fixed on each of said arbors, means detachably securing said elements to one of said members, means for simultaneously adjusting all of said elements relative to said one of said members, and means independent of said securing means for releasably securing said adjusting means to said one of said members for securing said arbors in different positions of rotary adjustment in said seats.

2. A pick-up reel for harvesters or the like comprising a driving shaft, a plurality of spaced members mounted concentrically on said shaft for rotation thereby, said members being formed peripherally with a plurality of outwardly opening, spaced seats, arbors detachably mounted for rotary adjustment in said seats, pick-up fingers on said arbors, an arm fixed on each of said arbors, means detachably connecting said arms to one of said members, an annular ring formed with a plurality of spaced slots engaging said connecting means for simultaneously adjusting all of said arms relative to said one of said members, and means independent of said connecting means for releasably securing said annular ring to said one of said members for securing said arbors and said fingers in different positions of rotary adjustment in said seats.

3. A pick-up reel for harvesters or the like comprising a driving shaft, a plurality of spaced parallel members mounted concentrically on said shaft for rotation thereby, said members being formed peripherally with a plurality of outwardly opening, spaced seats, arbors detachably mounted for rotary adjustment in said seats, pick-up fingers on said arbors, an arm fixed on each of said arbors, means detachably connecting said arms to one of said members, an annular ring formed with a plurality of outwardly opening, spaced slots engaging said connecting means for simultaneously adjusting said arms and said arbors and said fingers relative to said one of said members, and means independent of said connecting means for releasably securing said annular ring to said one of said members for securing said arms, arbors and fingers in different positions of rotary adjustment in said seats.

4. A pick-up reel for harvesters comprising a driving shaft, a plurality of spaced parallel members mounted concentrically on said shaft for rotation thereby, said members being formed peripherally with a plurality of outwardly opening, spaced seats, arbors detachably mounted for rotary adjustment in said seats, pick-up fingers on said arbors, an arm fixed on each of said arbors, bolt means for detachably connecting said arms to one of said members, an annular ring formed with a plurality of spaced slots engaging said connecting bolts, said ring being capable of limited rotation about said drive shaft relative to said one of said members for simultaneously adjusting all of said arms relative to said one of said members, and means independent of said connecting bolt means for releasably securing said annular ring to said one of said members for securing said arbors against rotation in said seats and securing said fingers in rotarily adjusted positions.

5. A pick-up reel for harvesters comprising a driving shaft, a plurality of spaced parallel members mounted concentrically on said shaft for rotation thereby, said members being formed peripherally with a plurality of outwardly opening, spaced seats, arbors detachably mounted for rotary adjustment in said seats, pick-up fingers on said arbors, an arm fixed on each of said arbors, bolt means for detachably connecting said arms to one of said members, an annular ring formed with a plurality of outwardly opening, spaced slots engaging said connecting bolts, said ring being capable of limited rotation about said shaft relative to said one of said members for simultaneously adjusting all of said arms relative to said one of said members, and bolt means independent of said connecting bolt means for releasably securing said annular ring to said one of said members for securing said arbors in different positions of rotary adjustment in said seats.

KENNETH J. VAN SICKLE.

REFERENCES CITED

The following references are of record in the file of this patent:

UNITED STATES PATENTS

| Number | Name | Date |
| --- | --- | --- |
| 1,877,519 | MacGregor | Sept. 13, 1932 |
| 2,115,385 | Edgington | Apr. 26, 1938 |
| 2,497,409 | Jones | Feb. 14, 1950 |
| 2,548,329 | Van Sickle | April 10, 1951 |